United States Patent [19]

Condon et al.

[11] Patent Number: 5,530,806
[45] Date of Patent: Jun. 25, 1996

[54] METHOD AND APPARATUS FOR STORING AND RETRIEVING ROUTING INFORMATION IN A NETWORK NODE

[75] Inventors: Joseph H. Condon, Summit, N.J.; Bart N. Locanthi, Beaverton, Oreg.

[73] Assignee: AT&T Corp., Murray Hill, N.J.

[21] Appl. No.: 356,930

[22] Filed: Dec. 15, 1994

[51] Int. Cl.$^6$ .................................................. G06F 11/00
[52] U.S. Cl. ............................ 395/185.02; 395/185.06; 370/60
[58] Field of Search ...................... 395/575, 185.02, 395/185.05, 185.06, 185.01; 370/60, 58.1

[56] References Cited

U.S. PATENT DOCUMENTS

| | | | |
|---|---|---|---|
| 5,271,010 | 12/1993 | Miyake et al. | 370/94.1 |
| 5,287,358 | 2/1994 | Nakayama | 370/94.1 |
| 5,323,389 | 6/1994 | Bitz et al. | 370/60.1 |
| 5,345,451 | 9/1994 | Uriu et al. | 371/42 |

OTHER PUBLICATIONS

D. P. Siewiorek et al., Computer Structures : Principles and Examples, pp. 389–392.

CCITT Recommendations I.361, *B–ISDN ATM Layer Specification*, Study Group XVIII, Report R–116, (Jul. 1992).

CCITT Recommendation I.432, *B–ISDN User Network Interface–Physical Layer Specification*, Study Group XVIII, Report R119, (1992).

*Primary Examiner*—Robert W. Beausoliel, Jr.
*Assistant Examiner*—Norman M. Wright

[57] ABSTRACT

Method and apparatus for storing and retrieving routing information in a node of a network, such as an ATM network, are disclosed. A routing table in each node of the network stores the routing information for each active call connection through the node, for example, identified by a virtual path identifier (VPI) and a virtual channel identifier (VCI). The routing table is indexed by a modified header error control (HEC) value, which may be the actual HEC value associated with a given cell, or a value calculated therefrom. Upon receipt of an incoming cell at a network node, the modified HEC value is calculated, to access the appropriate entry of the routing table. The routing table preferably stores a pointer to a memory location, such as a linked list of data structures, storing the actual routing information for each connection. An intermediate node data structure preferably stores the routing information for a particular connection through an intermediate node of the ATM network, while a leaf node data structure preferably stores the routing information for a particular connection associated with a leaf node of the ATM network. If a data structure in the indicated linked list has a VPI/VCI value matching the VPI/VCI value in the received cell header, the routing information for the next link of the call connection is retrieved, and the cell header information is validated.

36 Claims, 9 Drawing Sheets

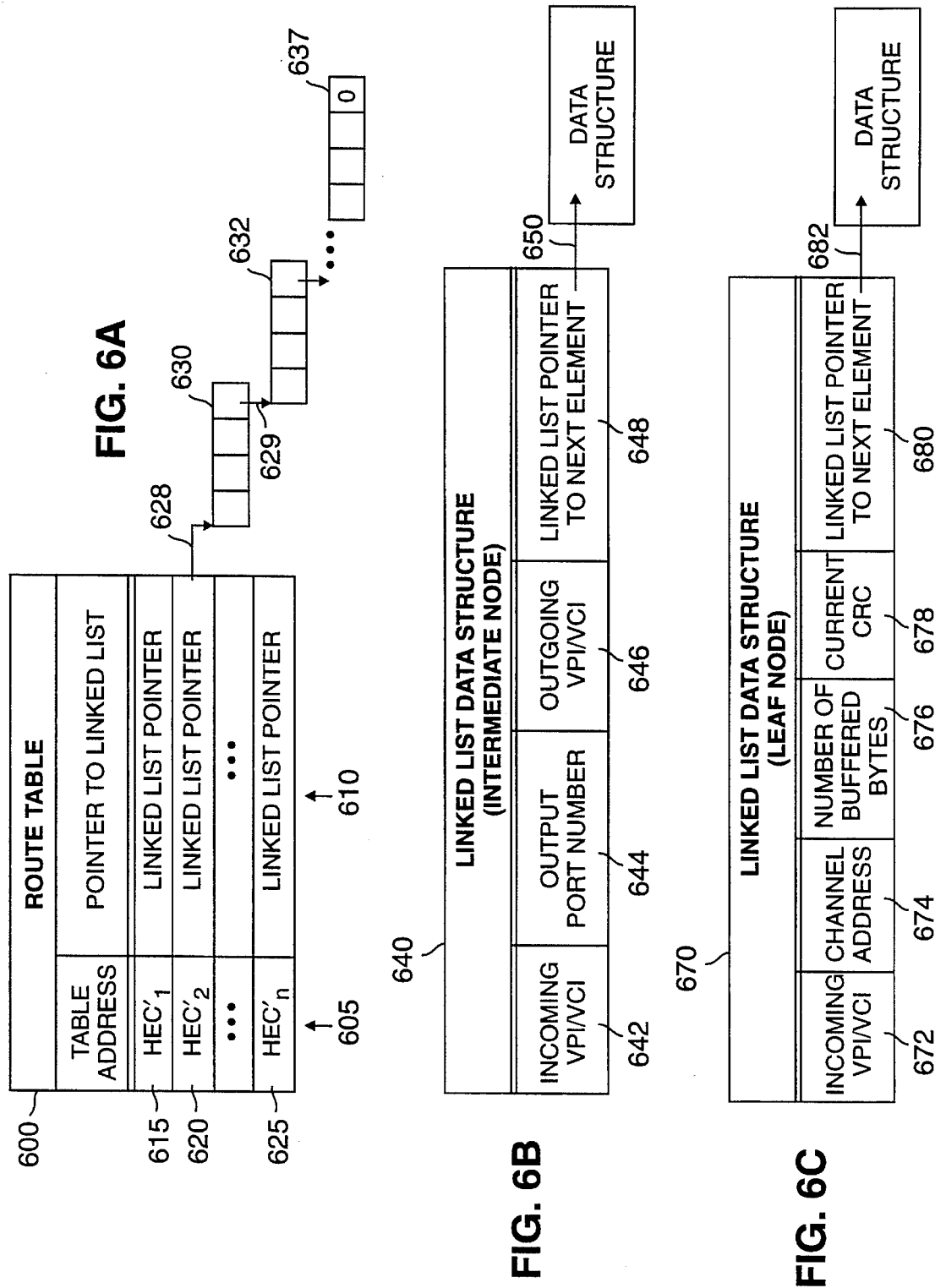

METHOD AND APPARATUS FOR STORING AND RETRIEVING ROUTING INFORMATION IN A NETWORK NODE

FIELD OF THE INVENTION

The present invention relates to a network communication system, and more particularly, to a method and apparatus for storage and retrieval of routing information in a node of a network, such as an ATM network, and for validating the cell header information.

BACKGROUND OF THE INVENTION

The use of asynchronous transfer mode (ATM) networks for the transfer of multimedia information, such as video, voice and data, has become increasingly popular due to the high data rate and flexibility associated with such networks. ATM networks utilize a cell-oriented switching and multiplexing technique, which has been specified by the International Telegraph and Telephone Consultative Committee (CCITT). For a general discussion of the CCITT standards, see M. dePrycker, Asynchronous Transfer Mode: Solutions from Broadband ISDN (Ellis Horwood, 1993). Generally, the ATM standard is based upon the use of short fixed-length "cells", comprised of a 48 byte payload information field, a four byte header field, containing routing and priority control information, and a one byte Header Error Control (HEC) field, containing a cyclic redundancy check (CRC), which serves to validate the header information.

ATM networks support connections of different bit rates, and allow bursty traffic to be integrated with continuous bit streams in a single network. Thus, ATM networks have been embraced by the computer and telecommunication industries for networking existing and future multimedia applications, such as video conferencing, video-on-demand, and telephone applications.

An ATM network is a connection-oriented network, in which each transfer of information between a source device and a destination device is preceded by a call to a network connection manager to establish a connection, often referred to as a virtual circuit, between the devices. Thus, the route between the devices is established prior to data transfer, and the connection is held during the entire transmission.

The basic concept in establishing an end-to-end connection in an ATM network is the request for a series of links from the source device to the destination device. The series of virtual channel links thus established is often referred to as a virtual channel connection (VCC). The virtual channel on each link of the overall connection is identified in each transmitted cell by a virtual channel identifier (VCI) in the cell header, as well as by a virtual path identifier (VPI), which identifies the virtual path to which the virtual channel belongs.

Thus, in order to route arriving cells, each switching node in an ATM network will typically include a routing translation table, which provides the VPI/VCI translation information for every cell going into the switching node. The relevant information for the routing translation table is entered during the call connection phase, and remains constant for the duration of a call.

The routing translation table may be implemented as a look-up table having an entry for each possible VPI/VCI combination. Since the VPI/VCI fields of an ATM cell header comprise 24 bits of information, the look-up table must have $2^{24}$ entries.

Although the large memory requirements for a direct look-up routing translation table may be justified for a switching node which handles a high volume of network traffic, such an implementation is clearly inefficient for a switching node handling lower traffic volume, such as a switching node near the periphery of the ATM network. For example, a leaf node in an ATM network, which may be embodied as a work station or other general purpose computing device, may only require ten active channels at any given time. Thus, of the $2^{24}$ entries in the leaf node's direct look-up routing table, only ten entries would be populated with routing information for an active connection.

In addition, a switching node must also typically separately process the cell header, which includes the VPI/VCI information, in order to validate the cell header information, by performing a cyclic redundancy check. If the CRC value calculated by the node for the received cell header matches the CRC value transmitted in the HEC field of the transmitted cell, the validity of the cell header information has been established.

As is apparent from the above discussion, a need exists for a more compact storage and retrieval system for storing the routing information utilized by switching nodes of an ATM network. In addition, a need exists for a routing information storage and retrieval system which validates the cell header information, while at the same time retrieving the necessary routing information from the routing translation table.

SUMMARY OF THE INVENTION

Generally, according to one aspect of the invention, upon receipt of a cell on an incoming link, identified by a virtual path identifier (VPI) and a virtual channel identifier (VCI), a network node, such as an ATM network node, can retrieve the necessary routing information associated with the cell, by accessing an entry in a routing table indexed by a modified header error control (HEC) value, which, in various embodiments, may be the actual HEC value associated with the cell, or a value calculated therefrom.

Another aspect of the invention provides a system for storing the routing information associated with a particular call connection through the node. The routing information is typically received from a network connection manager during a call connection phase, and remains constant for the duration of the call. A routing table is maintained in each switching node of the ATM network, for storing the routing information that has been specified by the network connection manager for each active call connection through the respective node.

The routing table, indexed by the possibly modified header error control (HEC) values, is preferably maintained by a call connection processor in each switching node. Each entry in the routing table will preferably include a pointer to a memory location where the actual routing information for a given active call connection through the node is stored, such as a linked list of data structures.

An intermediate node data structure is preferably utilized for storing the routing information for a particular connection through an intermediate node of the ATM network, while a leaf node data structure is preferably utilized for storing the routing information for a particular connection associated with a leaf node of the ATM network.

The intermediate node data structure preferably includes an entry for storing the VPI/VCI value that identifies the incoming link, as well as entries for storing the translated VPI/VCI information for the outgoing link, namely, the output port number and associated outgoing VPI/VCI value. The leaf node data structure preferably includes an entry for storing the VPI/VCI value that identifies the incoming link, as well as an entry for storing the corresponding channel address, which identifies a packet buffer where the individual cells of a packet may be accumulated. In addition, in order to implement packet-level validation of a transmitted packet, for example, in an AAL Type 5 implementation, the leaf node data structure preferably includes a counter for the number of bytes in the packet buffer, as well as an indication of the CRC value of the cell payloads stored in the packet buffer.

Upon receipt of an incoming cell, a processor in the receiving node will preferably utilize a cell router to analyze the cell information and identify the modified header error control (HEC) value associated with the cell, which may be utilized to access the appropriate entry of the routing table. In this manner, if the modified HEC value points to a linked list of data structures which includes a structure with the VPI/VCI value indicated in the cell header, then the routing information for the next link of the call connection may be retrieved, and the cell header information has been validated.

A more complete understanding of the present invention, as well as further features and advantages of the invention, will be obtained by reference to the detailed description and drawings.

BRIEF DESCRIPTION OF THE DRAWINGS

FIG. 6A illustrates a routing table and associated data structures, suitable for storing routing information for a switching node in the ATM network of FIG. 1;

FIG. 6B illustrates an intermediate node data structure suitable for storing the routing information for a particular connection through an intermediate node in the ATM network of FIG. 1;

FIG. 6C illustrates a leaf node data structure suitable for storing the routing information for a particular connection associated with a leaf mode in the ATM network of FIG. 1;

DETAILED DESCRIPTION

Figure 1:
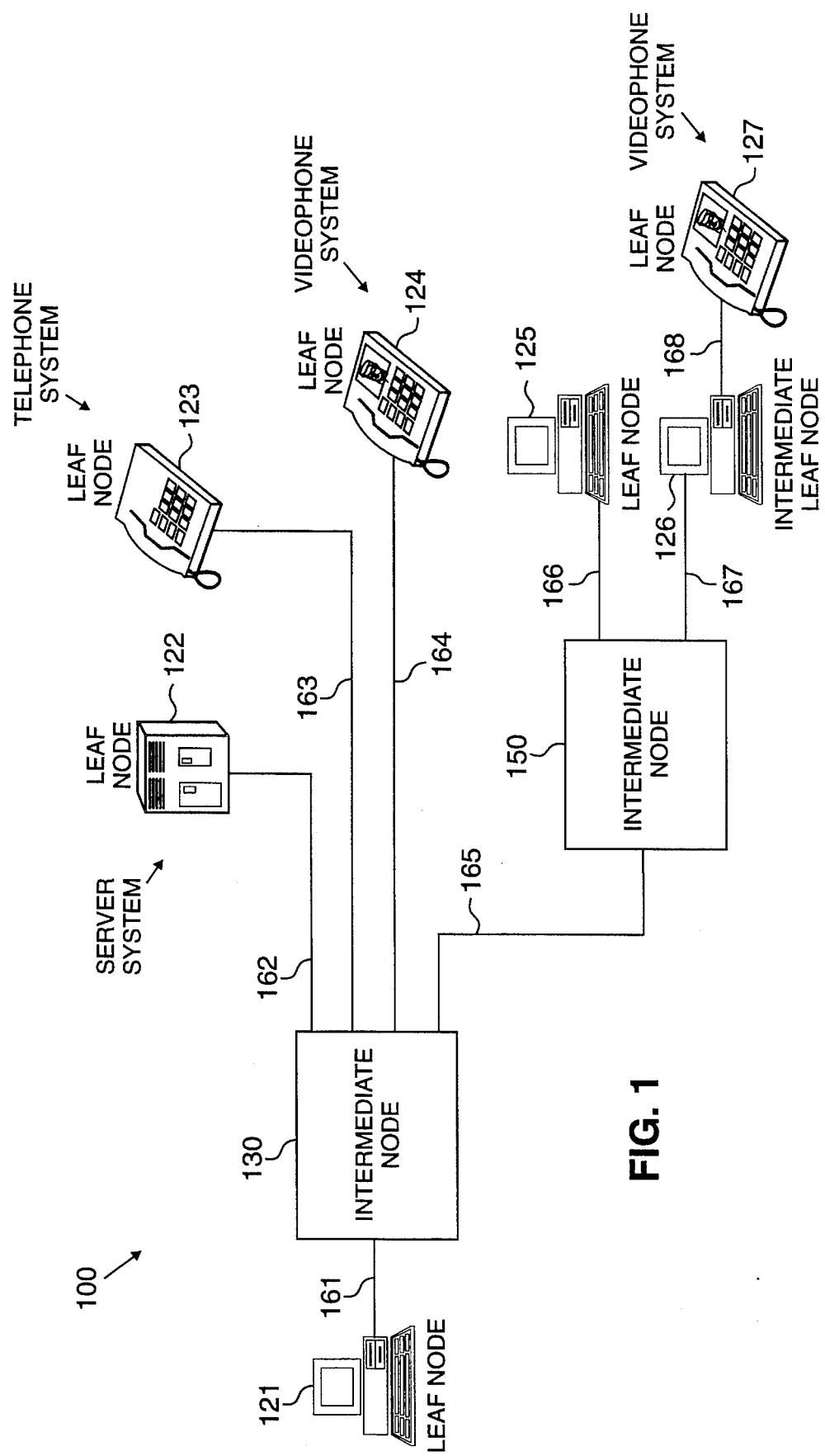
FIG. 1 illustrates a block diagram of an ATM network, suitable for transferring information from a source device to a destination device.

FIG. 1 shows an illustrative network environment 100 for transferring multimedia information, such as video, voice and data, from a source processing system, such as a work station 121, to a destination processing system, such as a work station 125. Although the illustrative network environment 100 is discussed hereinafter in terms of an asynchronous transfer mode (ATM) implementation, other suitable network environments may be utilized, as would be apparent to a person of ordinary skill in the art based on the disclosure herein.

The illustrative ATM network environment 100 of FIG. 1 preferably consists of a plurality of leaf nodes, such as the nodes 121 through 127, discussed further below in conjunction with FIGS. 4 and 5, interconnected by a plurality of data links, such as links 161 through 167, and one or more intermediate nodes, such as the intermediate nodes 130 and 150, discussed further below in conjunction with FIG. 3.

Each leaf node, such as the nodes 121 through 127, preferably executes one or more local processes, which may request information from another process executing on another node, across the network 100. In the illustrative embodiment, the leaf nodes 121–127 are embodied as work stations 121, 125 and 126, as well as other general purpose computing devices having at least one processing unit, such as a telephone system 123, a videophone system 124,127 and a server system 122, which may be embodied, for example, as a file server, a music server, or a video-on-demand system. In addition, the node 126 may serve as both an intermediate node 300, with respect to information destined for the videophone system 127, and a leaf node 400 with respect to information destined for a local process executing on the work station 126.

Figure 2A:
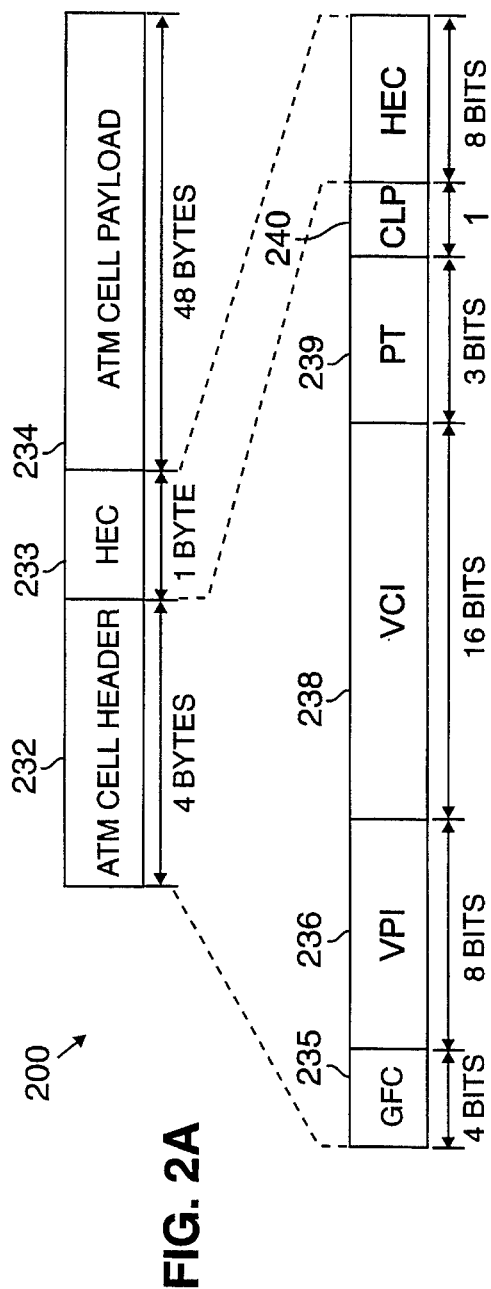
FIG. 2A illustrates the cell format definition for the ATM network of FIG. 1.

As is well known, an ATM network, such as the network 100, is a connection-oriented cell-switching network. The multimedia information transmitted through the network 100 is organized into short, fixed-length cells, in order to provide low latency. The cell format associated with the ATM standard is shown in FIG. 2A. For a more detailed description of the ATM cell format standard, see CCITT Recommendations I.361, *B-ISDN ATM Layer Specification*, Study Group XVIII, Report R-116, §2, pp. 2–9 (July 1992), incorporated herein by reference.

Generally, as shown in FIG. 2A, each ATM cell 200 has a fixed length of 53 bytes, comprised of a four byte cell header 232, a one byte header error control (HEC) 233 and a 48 byte cell payload 234. The HEC 233 is a Cyclic Redundancy Check (CRC) of the header information which is processed by the physical layer to detect errors in the header 232, allowing for single-bit error correction, or multiple bit error detection. The payload 234 contains user information, signalling information or operation and maintenance (OAM) information.

The header 232 includes the routing information and priority control information associated with the cell 200. The header 232 includes a four bit generic flow control (GFC) field 235, which can convey flow control information towards the network. The GFC field 235 has yet to be standardized by the CCITT and, in the meantime, will preferably have a value of 0000. In addition, the header 232 includes an eight bit Virtual Path Identifier (VPI) field 236 and a 16 bit Virtual Channel Identifier (VCI) field 238. As indicated above, the information in the VPI and VCI fields 236, 238 is used by the nodes in the network 100 to forward a received cell to the appropriate next stage of the network 100. It is noted that for a leaf node, such as the node 121, the VPI and VCI will indicate a local process.

In addition, the header 232 includes a three bit payload type (PT) field 239, which may be utilized to indicate whether the cell payload contains user information or network information. Finally, the cell header 232 includes a one bit cell loss priority (CLP) field 240, which may be utilized to indicate lower-priority cells.

In order to facilitate the transmission of larger blocks of information across the network 100, an ATM Adaptation Layer (AAL) has been defined which allows a large block of information to be transmitted across the network as a packet, comprised of one or more related cells independently transmitted through the network 100. Each cell in a given packet will travel through the network 100 along the same virtual path. It is noted, however, that although the cells for a given packet will arrive at an input port of a node of the network 100 in sequence, the cells may be interspersed with cells of other packets.

The cells of a given packet, which are headed for the same destination processing system, such as a work station 125, will have the same VPI and VCI information in the cell header 232. In fact, each cell in the packet will generally have virtually identical cell headers 232. Typically, however, the ATM Adaptation Layer will provide a mechanism for distinguishing the final cell in a given packet, for example, by defining an end-of-packet (EOP) bit in the payload type (PT) field 239. In this manner, if the EOP bit for a particular cell has not been set, additional cells from the same packet can be expected to arrive at the node.

Figure 2B:
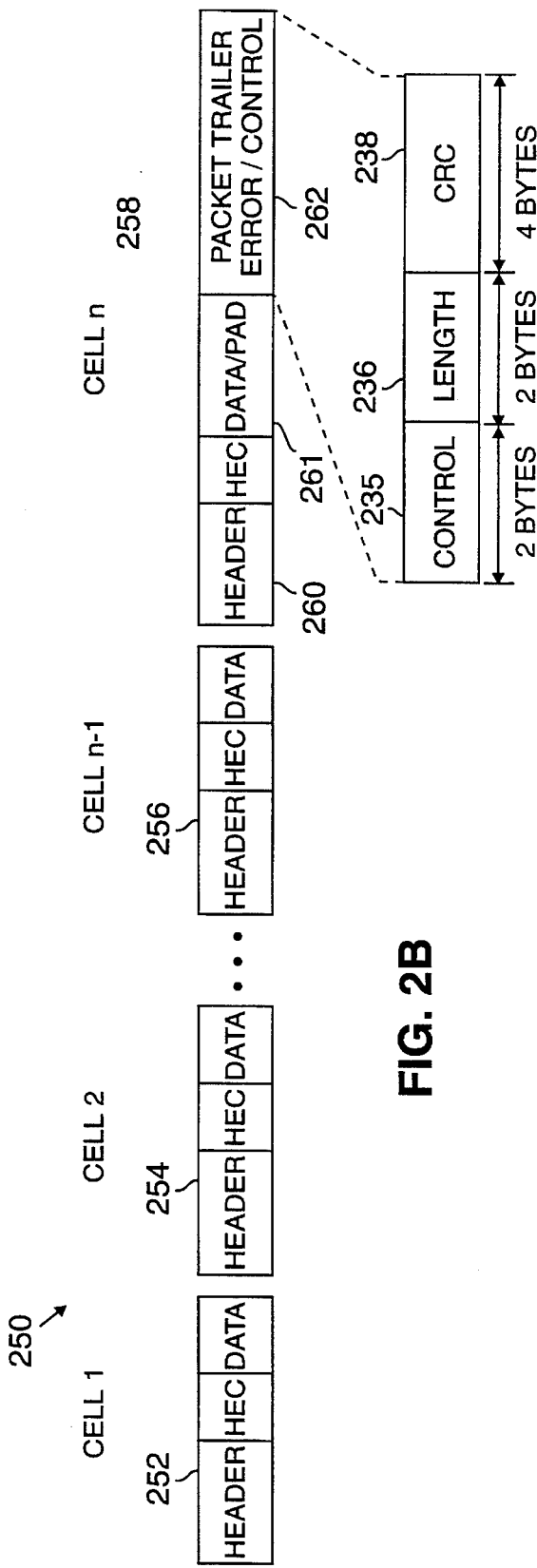
FIG. 2B illustrates the packet format definition for Type 5 of the ATM Adaptation Layer (AAL)

Five types of ATM Adaptation Layer (AAL) definitions have been proposed to date as standards. For example, the packet format definition for AAL Type 5, often referred to as the Simple and Efficient Adaptation Layer (SEAL), is shown in FIG. 2B. For a more detailed discussion of the various types of ATM Adaptation Layer definitions, see ATM Forum User-Network Interface Specification, version 3.0, ISBN 0-13-225863-3, (Prentice Hall, 1993), incorporated herein by reference.

Generally, as shown in FIG. 2B, an AAL Type 5 packet 250 will be comprised of a plurality of cells, such as the cells 252, 254, 256 and 258. Each of the cells 252–258 will include a cell header field, an HEC field and a data field, in the manner described above in conjunction with FIG. 2A. In addition, the final cell 258, in the packet 250, includes an eight byte packet trailer field 262, comprised of packet error and control information. Thus, in order to ensure that the final cell 258 maintains a length of 53 bytes, after the remaining data, if any, has been placed in the final cell 258, a pad is included in field 261 that can have a length of up to 40 bytes. It is noted that unlike the cell headers of the previous cells 252, 254, 256 in the packet 250, the cell header 260 of the final cell 258 will have the EOP bit set.

The packet trailer field 262 includes a two byte control field 235 which may be utilized to implement packet control features, in a known manner. In addition, the packet trailer 258 includes a two byte packet length field 236 and a four byte packet CRC field 238, which are utilized to implement packet-level error control, in a manner described further below.

Figure 3:
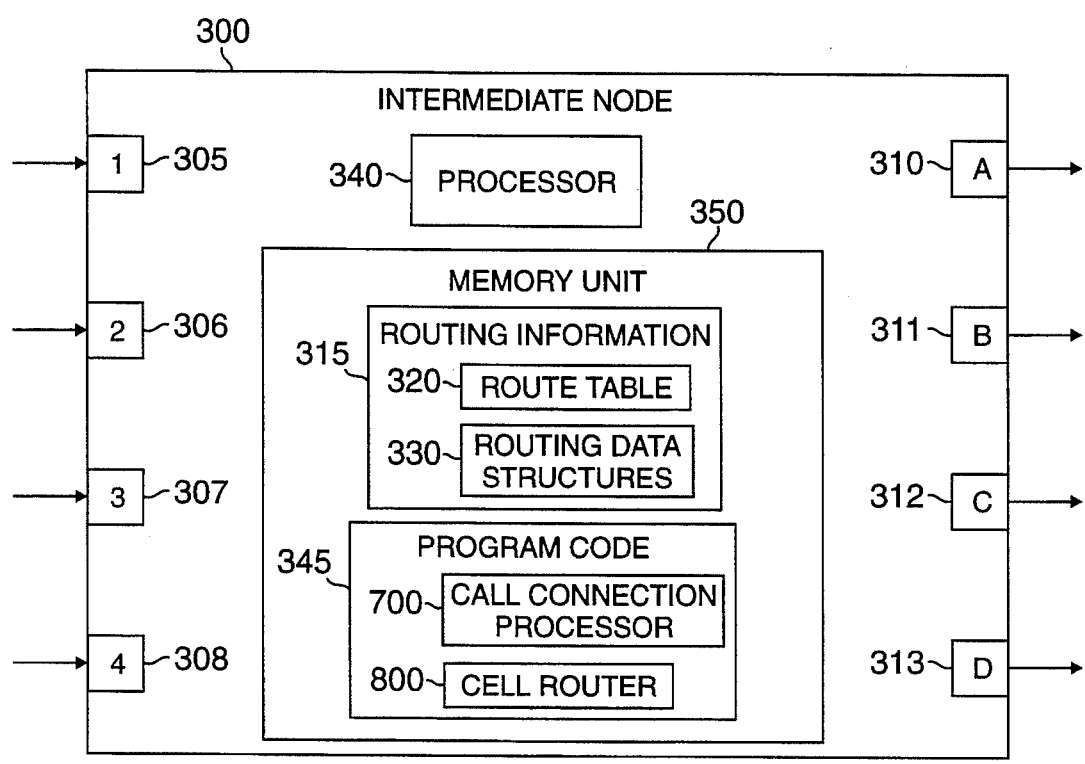
FIG. 3 illustrates in greater detail an intermediate node in the ATM network of FIG. 1.

As shown in FIG. 3, an intermediate node 300 may be comprised of one or more input ports, such as the input ports 305 through 308, and one or more output ports, such as the output ports 310 through 313. The intermediate node 300 includes at least one processing unit 340, which may be embodied as a single processor, or a number of processors operating in parallel. In addition, the intermediate node 300 includes a memory unit 350 for storing the routing information 315 and program code 345 necessary to route cells 200 that are received by the node 300 at an input port 305–308. The processor 340 is preferably configured to implement the program code 345, in a known manner.

As discussed further below in conjunction with FIGS. 6A through 6C, the routing information 315 preferably includes a route table 320 and a plurality of routing data structures 330. In addition, the program code 345 includes a call connection processor 700, discussed below in conjunction with FIG. 7, and a cell router 800, discussed below in conjunction with FIGS. 8A and 8B. The call connection processor 700 will receive the routing information associated with a given packet during the call connection phase, for example, from a network connection manager, and store the appropriate routing information in the route table 320 and data structures 330.

As discussed below, when an ATM cell is received by an intermediate node 300 on one of its input ports 305–308, the processor 340 will initiate the cell router 800 to evaluate the routing information in the header field 232. Thereafter, the cell router 800 will determine the appropriate output port 310–313 for the received cell, by accessing the routing table 320 and routing data structures 330, in a manner described further below.

Figure 4:
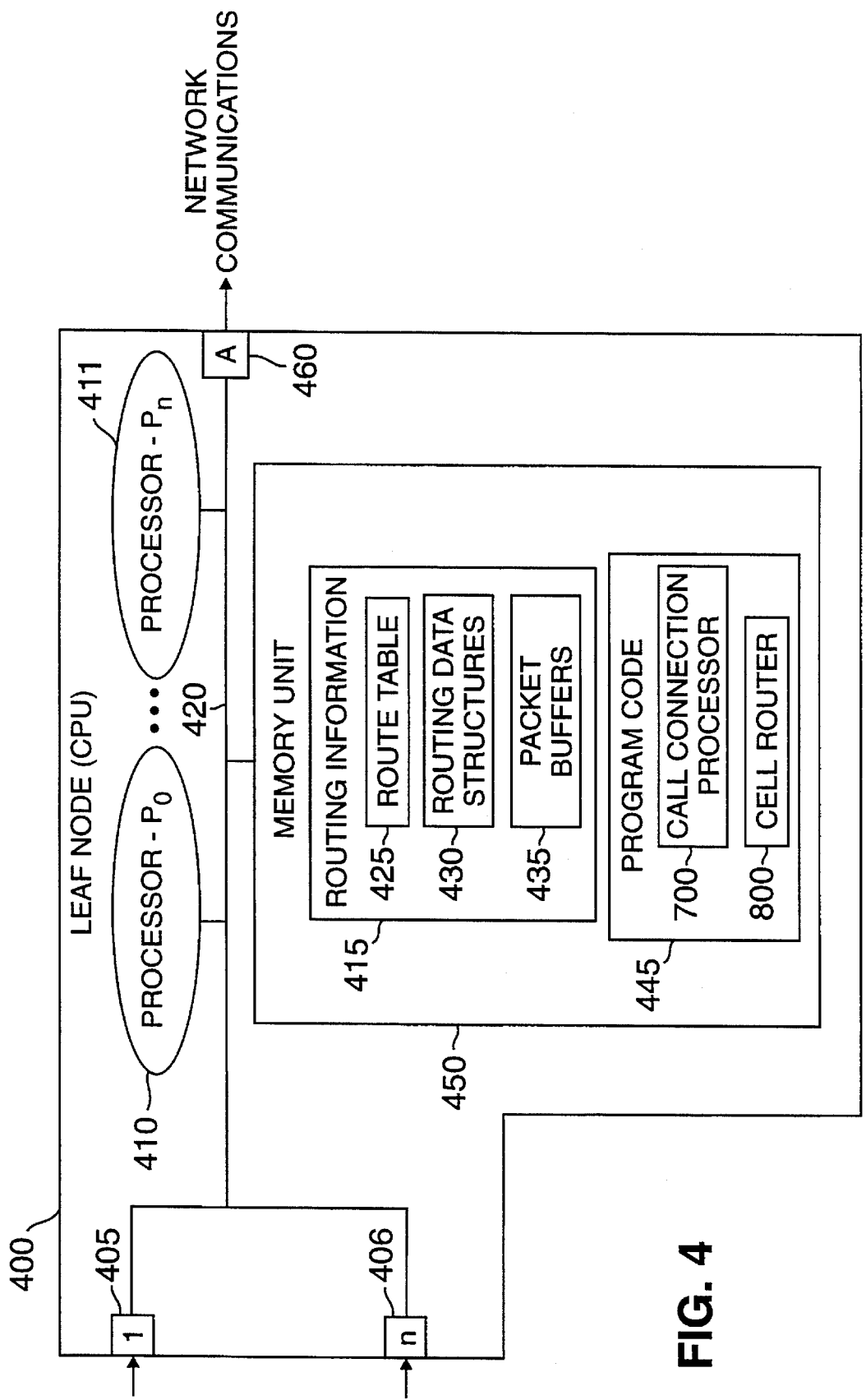
FIG. 4 illustrates in greater detail a leaf node in the ATM network of FIG. 1.

As shown in FIG. 4, a leaf node 400 may be comprised of one or more input ports, such as the input ports 405 and 406, as well as at least one output port 460, which may be utilized for network communications. The leaf node 400 includes at least one processing unit, such as the processing units 410 and 411, for executing one or more processes, $P_0$ through $P_n$. In the illustrative embodiment, the leaf node 400 includes a plurality of parallel processors, such as the processors 410 and 411, capable of executing a plurality of concurrent processes. In an alternate embodiment, the leaf node 400 may include a single processor capable of executing a plurality of concurrent processes by implementing a time sharing mechanism, in a known manner.

In addition, the leaf node 400 includes a memory unit 450 for storing the routing information 415 and program code 445 necessary to route cells 200 that are received by the node 400 at each of its input ports 405, 406. At least one processor 410, 411 is preferably configured to implement the program code 445, in a known manner. It is noted that if a node, such as the node 400, includes a plurality of processors, such as processors 410 and 411, each processor can have its own dedicated memory unit, or can share a common memory unit 450 with other processors in the node 400, as shown in FIG. 4.

As discussed further below in conjunction with FIGS. 6A through 6C, the routing information 415 preferably includes a route table 425 and a plurality of routing data structures 430. In addition, similar to the intermediate node 300, the program code 445 includes a call connection processor 700, discussed below in conjunction with FIG. 7, and a cell router 800, discussed below in conjunction with FIGS. 8A and 8B, for creating and accessing the routing information 415.

By definition, a cell received at a leaf node 400 is destined for a local process, such as the processes $P_0$ through $P_n$, executing on the node 400. The leaf node will preferably store the cells 200 received for a given packet 250 in a buffer 435 in the memory unit 450, until the complete packet 250 is received, for example, as indicated by an EOP bit. Once the complete packet is received, the packet will be passed to the appropriate process, such as the process $P_0$ through $P_n$.

Thus, as discussed below, when an ATM cell is received by a leaf node 400 on one of its input ports 405, 406, a processor, such as the processor 410, will initiate the cell router 800 to evaluate the routing information in the header field 232. If the received cell 200 is not the final cell in the packet 250, then the cell will be placed in the appropriate buffer 435. If, however, the cell is the final cell in the packet 250, then the complete packet will be retrieved from the appropriate buffer 435, for processing by the indicated process, $P_0$ through $P_n$.

Figure 5A:
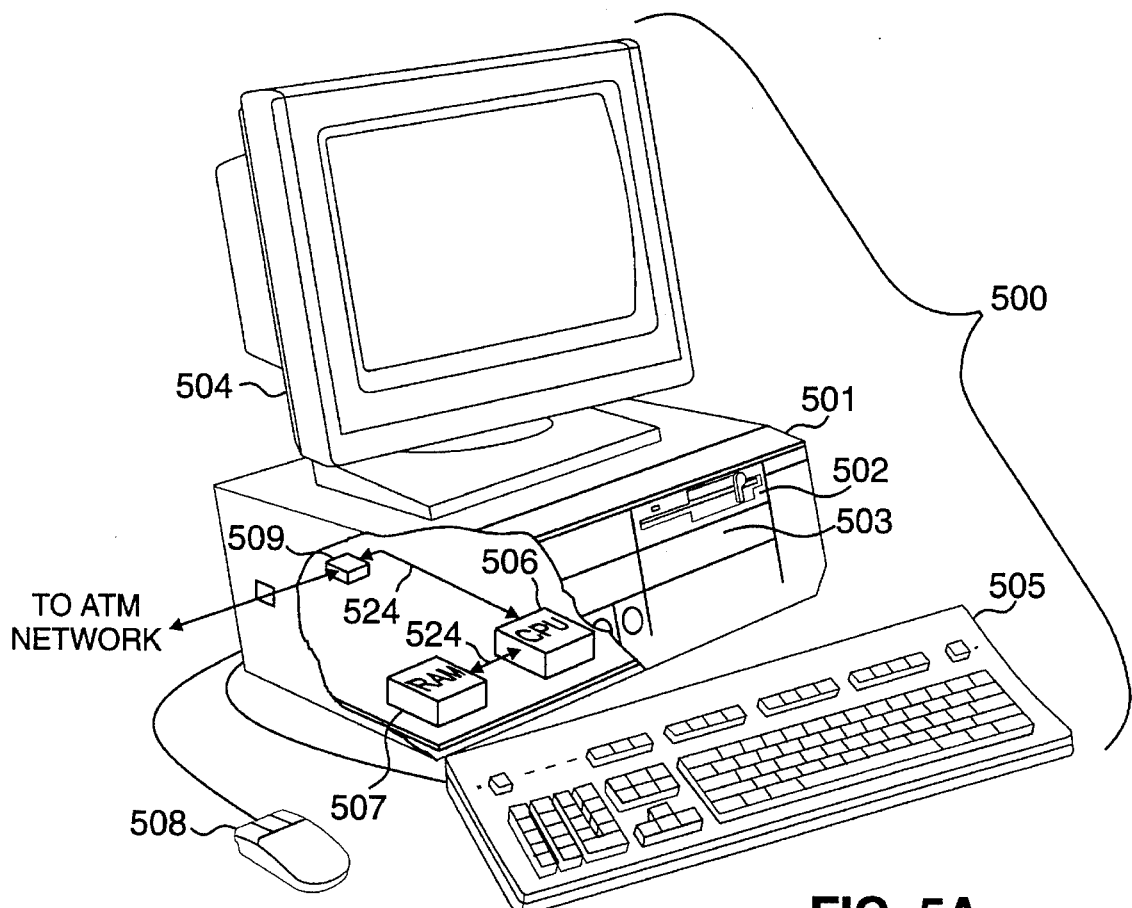
FIG. 5A illustrates an isometric view of a general purpose computing system which may function as a leaf node in the ATM network of FIG. 1.

One embodiment of a leaf node 400 is shown in further detail in FIG. 5A, which illustrates an isometric view of a general purpose computing system 500, which may be, for example, a mainframe computer, a minicomputer, a work station, or a personal computer. The general purpose computing system 500 preferably includes a display monitor 504, one or more processing units 506, such as a central processing unit (CPU), a memory storage device 507, such as a random access memory, busses 524 and one or more user interfaces, such as a mouse 508 and a keyboard 505. The processing unit 506 and memory storage device 507 are discussed further below, in conjunction with FIG. 5B. The CPU 506 is further connected to an ATM network interface 509, such as the ATM host adapter card commercially available from Fore Systems, Inc. of Pittsburgh, Pa.

The computing system 500 may also include an external disk drive 502 and a hard disk drive 503. The external disk drive 502 is operable to receive, read and write to one or more external data storage devices, such as a floppy disk, tape, or compact disk, while the hard disk drive 503 is operable to provide fast access data storage and retrieval functions, in a known manner. In addition, the computing system 500 preferably includes one or more data communication ports (not shown) for serial or parallel data communication with remote devices.

Figure 5B:
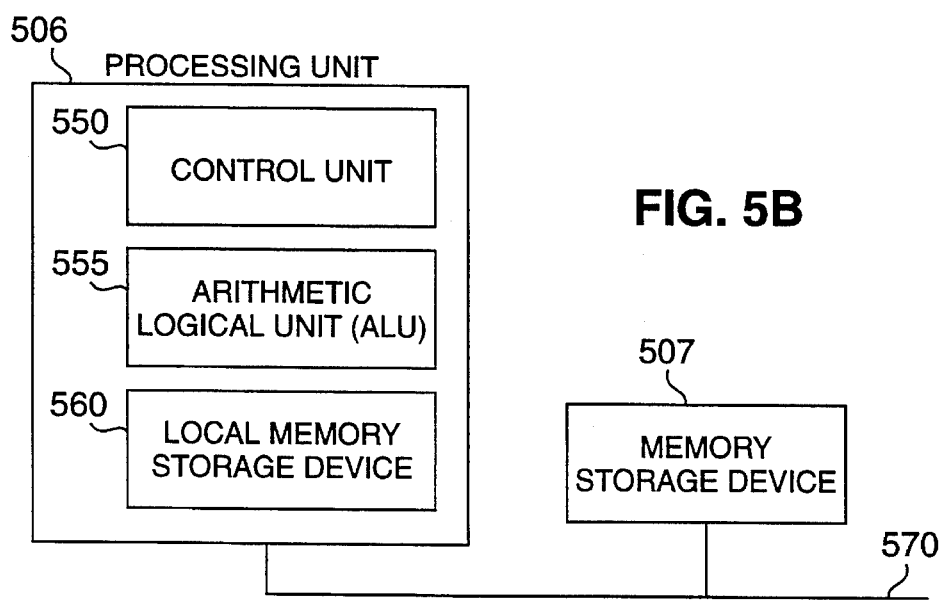
FIG. 5B illustrates a block diagram of a microprocessing system, which may be utilized in conjunction with the general purpose computing system of FIG. 5A.

FIG. 5B illustrates a schematic block diagram of a microprocessing system, which may be utilized in conjunction with the general purpose computing system 500 in FIG. 5A. The microprocessing system includes a processing unit 506, which may be embodied as a single processor or a number of processors operating in parallel, coupled via data bus 570 with a memory storage device, such as the RAM 507. The memory storage device 507 is operable to store one or more instructions which the processing unit 506 is operable to retrieve, interpret and execute.

The processing unit 506 includes a control unit 550, an arithmetic logic unit (ALU) 555, and a local memory storage device 560, such as, for example, a stackable cache or a plurality of registers. The control unit 550 is operable to retrieve instructions from the memory storage device 507. The ALU 555 is operable to perform a plurality of operations needed to carry out instructions. The local memory storage device 560 is operable to provide high speed storage used for storing temporary results and control information.

As indicated above, the routing information stored in each node of the network 100 includes a route table 600, illustrated in FIG. 6A. The routing information that is stored in the routing table 600 is entered during the call connection establishment phase by the call connection processor 700, discussed below in conjunction with FIG. 7, and will remain constant for the duration of a call.

According to one feature of the invention, each of the entries of the route table 600 is indexed by a modified header error control (HEC) value, which, as discussed below, may be the actual HEC value associated with the cells of a given connection, or a value calculated therefrom. In the preferred embodiment, the modified HEC value is defined to be equivalent to the eight-bit CRC of the 24 bit VPI/VCI value associated with the connection, assuming no errors in the transmission of the VPI/VCI value. However, in an alternate embodiment, the modified HEC values can be further truncated, for example, by dropping the two highest order bits, to provide a more compact routing table 600.

In an implementation which utilizes only the VPI/VCI bits and the EOP bit in the cell header, with all other bits being equal to zero, the actual HEC value transmitted with the cell will be equivalent to the eight-bit CRC of the connection's 24 bit VPI/VCI value, for all cells except the final cell in a packet. Thus, in such an implementation, the HEC value may be directly used to access the appropriate entry of the routing table 600 for all cells in a packet except the final cell, as discussed below in conjunction with FIG. 8. A separate entry can be created in the routing table 600 for the final cell in the packet, indexed by the final cell's HEC value, which is equivalent to the CRC of the cell header, with the EOP bit set, or, alternatively, a modified HEC value can be utilized to access the appropriate entry when the EOP bit is set.

In the general case, however, all bits other than the VPI/VCI and EOP bits are not reliably known to be set to zero. Thus, an algorithm is discussed below in conjunction with FIG. 8, for calculating the cell's modified HEC value, equal to the eight-bit CRC of the connection's 24 bit VPI/VCI value, assuming no transmission errors. The modified HEC value is calculated from the overall cell header information and the HEC value transmitted with the cell, as discussed below in conjunction with FIG. 8, to isolate the CRC of the connection's 24 bit VPI/VCI value.

Since the routing information for a given connection is stored in an entry of the routing table 600 that is indexed by the modified HEC value associated with a cell, which is equivalent to or calculated from the cell's actual HEC value, then the cell header information is validated upon the successful retrieval of the routing information for the cell.

As shown in FIG. 6A, the route table 600 will preferably be comprised of a pair of columns 605 and 610. A table address column 605 is populated with the possible combinations of the modified HEC. Thus, each row of the table 600, such as the rows 615, 620 and 625, is indexed by a different modified HEC value.

It is noted that since a number of different 24 bit VPI/VCI combinations will have the same modified eight bit HEC value, each row, such as the row 615, may be associated with a plurality of different path connections, each identified by a particular modified HEC value. Thus, the corresponding entry in the "pointer to linked list" column 610, if populated, will preferably contain a pointer 628 to a memory location where the actual routing information for the connection is stored, such as a pointer to a linked list of data structures associated with the corresponding modified HEC value. It is noted that when a particular row of the table 600 is populated, at least one active connection exists having the modified HEC value associated with that row.

The presently preferred embodiments of the linked list data structures are discussed below in conjunction with FIGS. 6B and 6C. Generally, as shown in FIG. 6A, each data structure in the linked list indicated in the entry in column 610, such as the structures 630, 632 and 637, will have a pointer, such as the pointer 629, to the next data structure in the linked list. The final data structure 637 in the linked list will preferably have a null pointer, in a known manner, as shown in FIG. 6A.

In this manner, when a cell is received at an input port of a node, the cell header can be processed by the cell router 800, in a manner described below, to identify the modified HEC value associated with the cell and thereby access the appropriate row of the route table 600. Thereafter, the data structures in the indicated linked list can be searched to identify the particular data structure having an incoming VPI/VCI value that matches the received VPI/VCI value. This step allows the appropriate routing information to be retrieved from the identified data structure, while at the same time verifying the accuracy of the cell header.

As previously indicated, an ATM network 100 will typically be comprised of two types of nodes, namely, intermediate nodes 300 and leaf nodes 400. Since, by definition, the particular routing information necessary to route a cell through an intermediate node 300 or to a local process executing on a leaf node 400 is different, the routing data structures associated with each type of node are preferably customized for the routing information to be stored. Thus, a presently referred embodiment of a linked list data structure 640, suitable for storing routing information for an intermediate node 300, is shown in FIG. 6B. In addition, a presently preferred embodiment of a linked list data structure 670, suitable for storing routing information for a leaf node 400, is shown in FIG. 6C.

As previously indicated, a given node may serve as both an intermediate node 300 and a leaf node 400. For example, the node 126 shown in FIG. 1 serves as both an intermediate node 300, with respect to cells destined for the videophone system 127, and a leaf node 400 with respect to any local processes that may be executing on the node 126. Thus, some of the data structures in a particular linked list of structures, such as the data structures 630,632 and 637 of FIG. 6A, may have the form associated with an intermediate node data structure 640 (FIG. 6B), while some structures in the list may have the form of a leaf node data structure 670 (FIG. 6C).

A data structure 640, suitable for storing the routing information for a particular connection through an intermediate node 300, is shown in FIG. 6B. In a preferred embodiment, the intermediate node data structure 640 includes an entry 642 for storing the incoming VPI/VCI value associated with the connection, an entry 644 for storing the output port number, and an entry 646 for storing the outgoing VPI/VCI value. It is noted that the values stored in entries 642, 644 and 646 are received from a network connection manager during the call connection phase, and are placed in the data structure 640 by the call connection processor 700. In addition, the intermediate node data structure 640 includes an element 648 for storing a pointer 650 to the next element in the linked list.

A data structure 670, suitable for storing the routing information for a particular connection associated with a leaf node 400, is shown in FIG. 6C. In a preferred embodiment, the leaf node data structure 670 includes an entry 672 for storing the incoming VPI/VCI value associated with the connection, and an entry 674 for storing the channel address, which identifies a packet buffer 435 where the individual cells of the packet are stored until the packet is complete. In an implementation where there is packet-level verification, such as for an AAL Type 5 implementation, the leaf node data structure 670 preferably also includes entries for storing the packet verification information, such as an entry 676 for storing a counter of the number of bytes currently stored in the indicated buffer, and an entry 678 containing the CRC value of the data currently stored in the buffer. In addition, the leaf node data structure 670 includes an element 680 for storing a pointer 682 to the next element in the linked list.

It is noted that the values stored in entries 672, 674 and 676 are received either directly or indirectly from the network connection manager during the call connection phase, for placement in the data structure 640 by the call connection processor 700. If a particular process executing on the leaf node 400 has requested allocation of a channel through the network 100, identified by an allocation request identifier, the information received from the network connection manager upon creation of the requested channel may be limited to the incoming VPI/VCI value and the allocation request identifier. In this implementation, the leaf node 400 must translate the allocation request identifier back to the particular process and channel that requested the information, in order to populate element 674 of the leaf node data structure 670.

Figure 7:
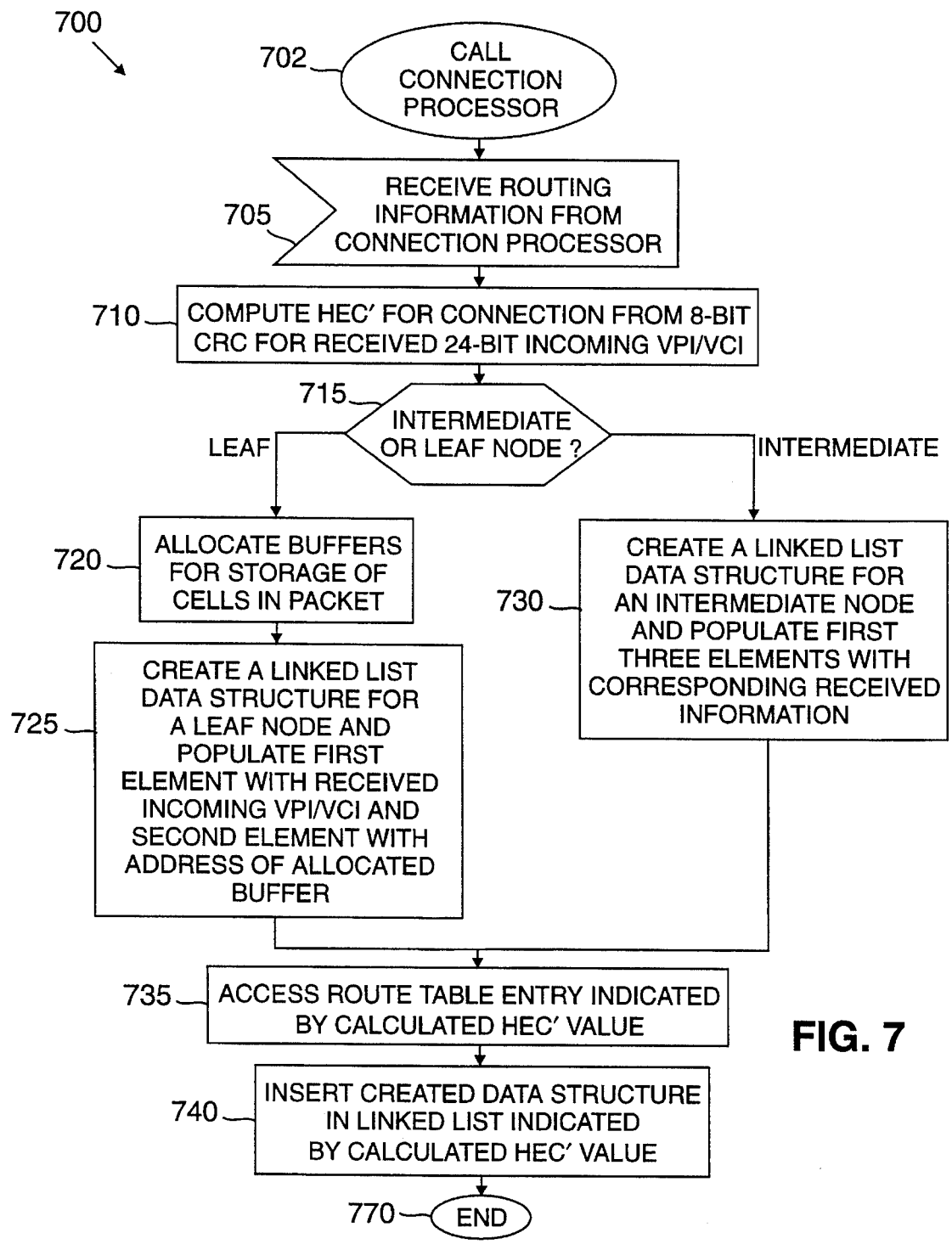
FIG. 7 is a flow chart describing an exemplary call connection processor which may be utilized by the switching nodes in the ATM network of FIG. 1 to maintain the routing tables of FIG. 6.

As previously indicated, each node, such as the intermediate node 300 and the leaf node 400, includes a call connection processor 700, illustrated in FIG. 7, which will receive the appropriate routing information for a particular connection through the node from a network connection manager during the call establishment phase. Thereafter, the call connection processor 700 will update the routing table 600 and routing data structures 640, 670 stored for the node to reflect the routing information for the new connection.

As shown in FIG. 7, the call connection processor 700 will be entered at step 705 upon receipt of routing information from a connection processor. As previously indicated, the received routing information will include an incoming VPI/VCI value, as well as information that identifies where the node should direct the received cells. The call connection processor 700 will preferably compute the modified HEC value, HEC', associated with the connection, from the eight bit CRC value for the incoming VPI/VCI value indicated with the received routing information during step 710. As previously indicated, the modified HEC value, or a truncation thereof, will be utilized as a hash to store the routing information.

A test is performed during step 715 to determine if the node is an intermediate node 300 or a leaf node 400. If it is determined during step 715 that the node is a leaf node 400, then cells received during the data transmission phase are destined for a local process, and should preferably be buffered until the complete packet is received. Thus, the call connection processor 700 will allocate at least one buffer during step 720 for storage of the cells in the packet. Thereafter, a leaf node data structure 670 is created during step 725, .and the first element 672 is populated with the incoming VPI/VCI indicated in the received routing information. In addition, the second element 674 of the leaf node data structure 670 is populated with the address of the buffers allocated during step 720.

If, however, it is determined during step 715 that the node is an intermediate node 300, then cells received during the data transmission phase should be transmitted on the indicated output path on a cell-by-cell basis. Thus, the call connection processor 700 will create an intermediate node data structure 640 during step 730, and the elements 642, 644 and 646 are populated with the corresponding values indicated in the received routing information.

Thereafter, during step 735, the call connection processor 700 will access the entry of the routing table 600 indicated by the modified HEC value, HEC', calculated during step 710. The data structure 640 or 670 created during step 725 or 730 is then inserted during step 740 in the linked list indicated by the calculated modified HEC value. Step 740 may be implemented, for example, by copying the pointer 628 to the linked list, if any, from the entry of the route table 600 accessed during step 735 into the last element of the data structure 640, 670 created during step 725 or 730, and then copying the pointer to the new created data structure into the entry of the route table 600 accessed during step 735.

Thereafter, execution of the call connection processor 700 will terminate during step 770.

Figure 8A:
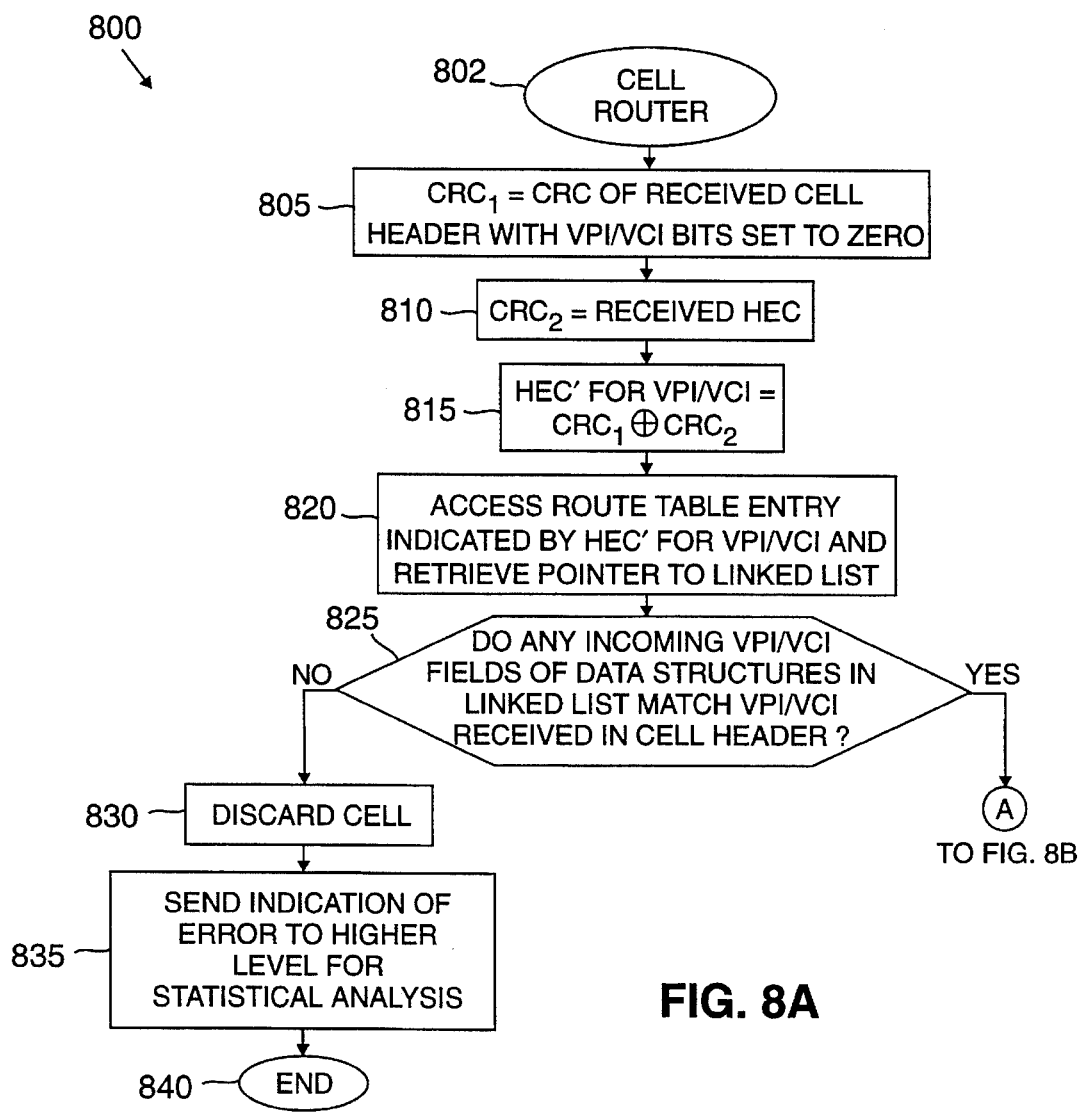
FIGS. 8A and 8B, collectively, are a flow chart describing an exemplary cell router which may be utilized by the switching nodes in the ATM network of FIG. 1 upon receipt of a cell at an input port to access the routing table and data structures of FIG. 6 in determining where to send the received cell.
Figure 8B:
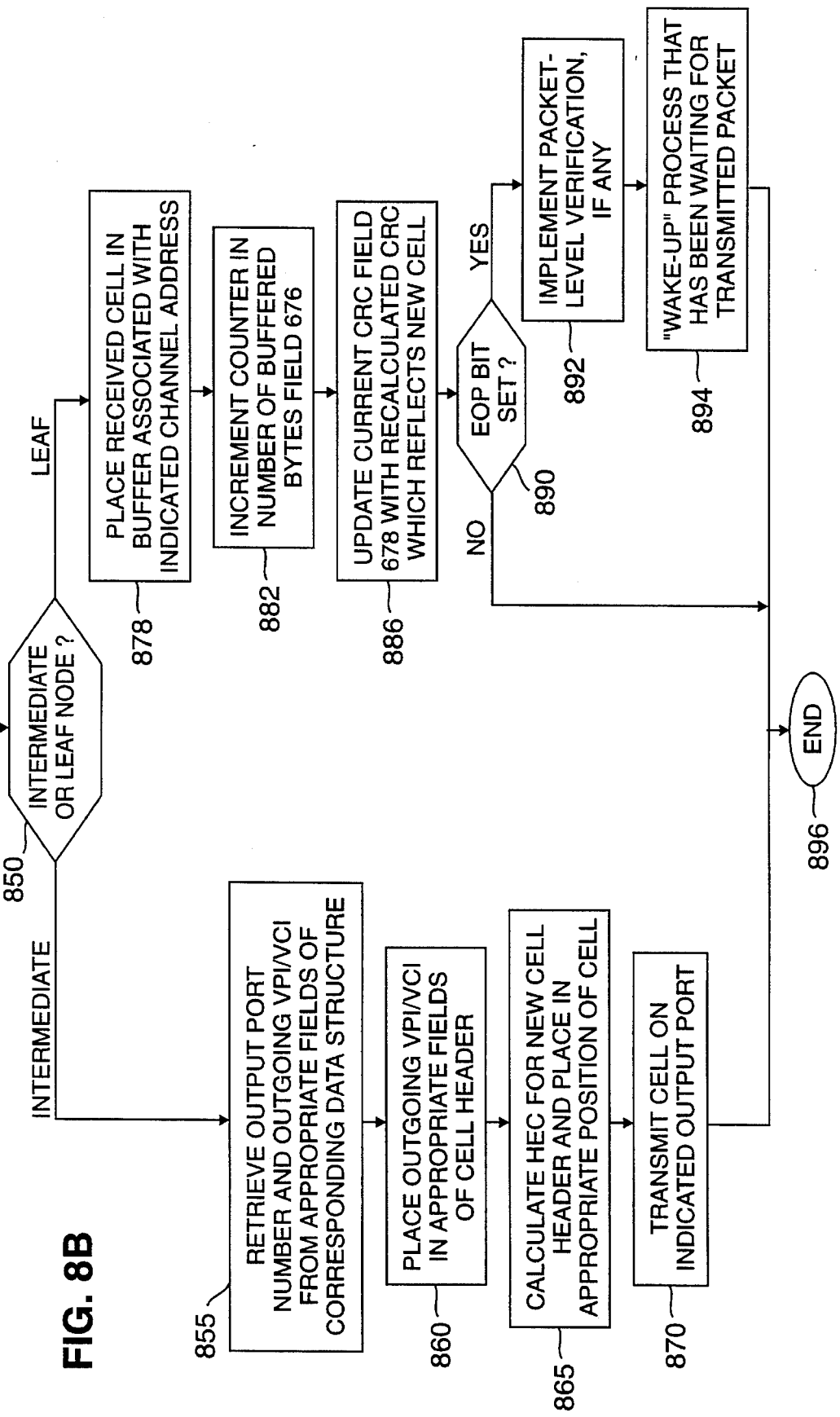

As previously indicated, each node, such as the intermediate node 300 and the leaf node 400, includes a cell router 800, illustrated in FIGS. 8A and 8B, which upon receipt of a cell at an input port, will evaluate the routing information in the header field 232. Thereafter, the cell router 800 will access the appropriate entries of the routing information, and determine where to send the received cell.

As shown in FIG. 8A, the cell router 800 will be entered at step 805 upon receipt of a cell at an input port of the associated node. As previously indicated, the routing information for a particular connection is preferably stored in an entry of the routing table 600 indexed by the connection's modified header error control (HEC) value, which may be the actual HEC value associated with the cell, or a value calculated therefrom. In the preferred embodiment, the modified HEC value is defined to be equivalent to the eight-bit CRC of the 24 bit VPI/VCI value associated with the connection, assuming no errors in the transmission of the VPI/VCI value. Thus, the modified HEC is calculated herein from the overall cell header information and the actual HEC value transmitted with the cell to isolate the CRC value for the VPI/VCI value, during steps 805 through 815.

Thus, a variable, $CRC_1$, is defined during step 805 to be the CRC value of the received cell header with the VPI/VCI bits set to zero. Thereafter, a second variable, $CRC_2$, is defined during step 810 to be the HEC value indicated in the received cell, which corresponds to the CRC of the overall cell header, assuming no errors in transmission.

The modified HEC value, HEC', which serves as the index into the routing table 600, is calculated during step 815 according to the following equation:

$$\text{CRC for VPI/VCI} = CRC_1 \oplus CRC_2,$$

where the symbol $\oplus$ indicates the "exclusive or" function. It is noted that in an implementation where the bits in the cell header other than the VPI/VCI and EOP bits are not utilized, and are known to be set to zero, the modified HEC value will be equal to the received HEC for all cells except the final cell in a packet and need not be calculated.

The entry of the route table 600 indicated by the modified HEC value calculated during step 815 is then accessed during step 820 and the pointer 628 to the linked list is retrieved from the entry in column 610. Thereafter, a test is performed during step 825 to determine if any incoming VPI/VCI fields of the data structures 640, 670 in the indicated linked list match the VPI/VCI value received in the cell header. If it is determined during step 825 that the VPI/VCI values do not match, an error has corrupted the cell header, and the cell is discarded during step 830. Thereafter, an indication of the detected error may be sent to a higher level protocol for statistical analysis, in a known manner. Execution of the cell router 800 will then terminate during step 840.

If, however, it is determined during step 825 that the received VPI/VCI value does match an incoming VPI/VCI value in one of the data structures 640, 670 of the indicated linked list, then the accuracy of the cell header has been validated, and program control will proceed to step 850 (FIG. 8B), for routing of the cell.

A test is performed during step 850 to determine if the node is an intermediate node 300 or a leaf node 400. If it is determined during step 850 that the node is an intermediate node 300, then the cell router 800 will determine the appropriate output port 310–313 for the transmitting the received cell, by accessing the routing table 320 and rolling data structures 330, during steps 855 through 870.

The appropriate output port and outgoing VPI/VCI value are retrieved from the appropriate fields 644, 646 of the indicated intermediate node data structure 640 during step 855. Thereafter, the retrieved outgoing VPI/VCI value will be placed in the appropriate fields 236, 238 of the cell header 232 during step 860.

The cell router 800 will then calculate the HEC value for the new cell header and place the calculated value in the HEC field 233 of the cell 200. For a discussion of the HEC calculation, see CCITT Recommendation I.432, *B-ISDN User Network Interface-Physical Layer*, Study Group XVIII, Report R119, § 4.3, pp. 176–180 (1992), incorporated herein by reference. Finally, the cell router 800 will transmit the cell on the appropriate output port during step 870. If, however, it is determined during step 850 that the node is a leaf node 400, then the cell router 800 will place the received cell in the buffer indicated by the pointer from field 674 of the leaf node data structure 670.

In addition, in an implementation having packet-level verification, such as an AAL Type 5 implementation, steps 882 and 886 are preferably performed. The byte counter in the "number of buffered bytes" field 676 of the leaf node data structure 670 is preferably incremented during step 882. The CRC that is stored in field 678 of the leaf node data structure 670 is preferably updated during step 886 to reflect the CRC value for all of the cells now in the packet buffer. For example, the CRC can be recalculated during step 886, by initializing the CRC engine, which may be implemented in hardware or software, in a known manner, with the previous CRC value retrieved from the CRC field 678 and then computing the CRC of the new cell to obtain the recalculated CRC.

A test is performed during step 890 to determine whether the cell is the final cell of a packet 250, in other words, whether the EOP bit in the cell header has been set. If it is determined during step 890 that the EOP bit in the cell header has not been set, then the received cell is merely an intermediate cell in a packet, and execution of the cell router 800 will terminate during step 896.

If, however, it was determined during step 874 that the EOP bit in the cell header has been set, then the received cell is the final cell in a packet and the complete packet should be passed to the destination process. Thus, if the ATM Adaptation Layer type definition includes packet verification mechanisms, such as the AAL Type 5, this information is preferably validated during step 892.

For example, the final cell of an AAL Type 5 packet will include a packet length field 236 and a packet CRC field 238, as shown in FIG. 2B. Thus, in the illustrative embodiment, the packet length value is retrieved from field 236 and compared against the value indicated in the byte counter in field 676 of the leaf node data structure 670. Similarly, the packet CRC value is preferably retrieved from the field 238 and compared against the value indicated in the CRC field 678 of the leaf node data structure 670. It is noted that if packet errors are detected during step 892, they will be handled by a higher level protocol, in a known manner.

Once the completed packet has been received and validated, the destination process which has been blocked while awaiting transmission of the packet will be awakened during step 894, in order to process the transmitted packet. Thereafter, execution of the cell router 800 will terminate during step 896.

It is noted that for a leaf node, such as the leaf node 400, where one or more processes may be waiting for a completed packet to be received in order to resume processing, it may not be desirable to interrupt the node processor upon each received cell, in the manner described above. Thus, in an alternate embodiment, a leaf node, such as the leaf node 400, will accumulate each received cell 200 in an input FIFO or buffer (not shown), in the manner described above, until one of a number of predefined triggering conditions occurs. Once a predefined triggering condition is detected, the processor will be interrupted to process the cells received since the last interrupt.

First, the leaf node will preferably begin processing the cells in the FIFO whenever an end-of-packet (EOP) indication is received. In addition, the leaf node will also preferably begin processing the cells in the FIFO when either a time-out condition has occurred, or the capacity of the FIFO is about to be exceeded, without receiving an EOP indication.

When one of these triggering conditions is detected, the processor will interrupt its processing, to process each of the cells that have been placed in the FIFO since the last interrupt, in the manner described above in conjunction with FIG. 8. Thus, if the predefined condition state has been triggered by receipt of a cell having its EOP bit set, at least one of the packets being constructed by the leaf node for its local processes is now complete. Accordingly, the destination process associated with the completed packet will be awakened in order to process the packet.

In an alternate embodiment, suitable for use in an implementation utilizing only the VPI/VCI bits and the EOP bit in the cell header, the call connection processor 700 will preferably establish two entries in the route table 600 during the call connection establishment phase. It is again noted that each of the cells in a given packet will have the same VPI/VCI value, with the cell headers differing only by the EOP bit being set for the final cell of the packet.

In this alternate embodiment, the first entry created in the route table 600 for the connection is indexed by the HEC of the cell header without the EOP bit set, and will be utilized for each cell in the packet except the final cell. The second entry created in the route table 600 for the connection is indexed by the HEC of the cell header with the EOP bit set, and will be utilized only by the final cell. Preferably, both entries will point to the same packet buffer 435. As each cell is received, the cell router 800 will preferably retrieve the HEC value from the appropriate field of the cell and then directly access the entry in the routing table 600 indicated by the HEC value. Thereafter, the cell router 800 will commence processing at step 825, as shown in FIG. 8A.

It is to be understood that the embodiments and variations shown and described herein are illustrative of the principles of this invention only and that various modifications may be implemented by those skilled in the art without departing from the scope and spirit of the invention.

In particular, although the above embodiments have been described with reference to an ATM network environment, the disclosed methods and apparatus for storing and retrieving routing information may be utilized in other suitable network environments as well. Specifically, the principles and techniques disclosed herein may be applied to any network environment having a cell format definition consisting of a cell header that includes an incoming route identifier, analogous to the VPI and VCI information in the cell header of the ATM standard, as well as a header error control value calculated in accordance with a data error detection function of the cell header information, analogous to the HEC values of the ATM standard.

We claim:

1. A system, for use in conjunction with a network node in a network, for routing a cell transmitted through said network node across said network from a source process to a destination process, said cell upon being received at the network node, being comprised of a received cell header, a received header error control value and received cell payload information, said received cell header comprising a received incoming route identifier, said received header error control value providing a basis to check said received cell header information including said route identifier for accuracy, said routing system comprising:

a computing system having a processor and memory;

means for storing routing information received from a network connection manager at a memory location in said memory prior to receipt of said cell at the network node, said routing information including an incoming route identifier and a destination identifier;

said memory location having an address which may be determined from said received header error control value;

said processor further comprising:
means for determining said received incoming route identifier and said received header error control value from said received cell header;
means for determining said address from said received header error control value;
means for comparing the incoming route identifier stored at said address and the received incoming route identifier determined from said cell header; and
means for routing said cell in accordance with said destination identifier stored at said address, if said incoming route identifier stored at said address matches said received incoming route identifier.

2. The routing system of claim 1, wherein said network is an ATM network and wherein said incoming route identifier is comprised of a virtual path identifier and a virtual channel identifier.

3. The routing system of claim 1, wherein said cell is part of a packet of cells transmitted across said network, and wherein said memory location further stores a pointer which indicates a buffer where each of said cells in said packet should be stored until said complete packet is received.

4. The routing system of claim 1, wherein said node is a leaf node and said destination identifier indicates a destination process executing on said node.

5. The routing system of claim 1, wherein said node is an intermediate node and said destination identifier indicates an output port on said node and an outgoing path identifier.

6. The routing system of claim 1, wherein said basis to check is a cyclic redundancy check of said header information.

7. The routing system of claim 1, wherein said memory defines a data structure in a linked list of data structures pointed to by a pointer determined from said received header error control value, each of said data structures in said linked list being identified by said stored incoming route identifier.

8. A system for storing routing information in a telecommunications switch, said routing information associated with one or more cells transmitted across a network from a source processs to a destination process, each of said cells upon receipt at the destination process being comprised of a received cell header, a received header error control value and received cell payload information, said received cell header including a received incoming route identifier, said received header error control value being calculated to provide a basis to check said received cell header information including said route identifier for accuracy of transmission, said telecommunications switch employing a computing system having a processor and storage means, said routing information storage system comprising:

means for receiving said routing information from a network connection manager prior to said receipt of said one or more cells, said routing information including an incoming route identifier and a destination identifier for each of said one or more cells; and means for storing said routing information in a memory element in said storage means, the location of said memory element in said storage means corresponding to an address value which may be determined from said, received header error control value.

9. The routing information storage system of claim 8, wherein said network is an ATM network and wherein said incoming route identifier is comprised of a virtual path identifier and a virtual channel identifier.

10. The routing information storage system of claim 8, wherein said telecommunications switch is a leaf node and said destination identifier indicates a destination process executing on said node.

11. The routing information storage system of claim 8, wherein said telecommunications switch is an intermediate node and said destination identifier indicates an output port on said node and an outgoing path identifier.

12. The routing information storage system of claim 8, wherein said basis to check is a cyclic redundancy check of said header information.

13. The routing information storage system of claim 8, wherein said memory element is a data structure in a linked list of data structures pointed to by a pointer determined from said received header error control value, each of said data structures in said linked list being identified by said storred incoming route identifier.

14. A system for use by a leaf node in a telecommunications network for routing a plurality of cells received by said node on an input port, at least one of said received cells forming a data packet and being transmitted across said network from a source process to a destination process executing on said leaf node, each of said cells received at said input port being placed in an input register, each of said received cells including a received cell header, a received header error control value and received cell payload information, said received cell header including an incoming route identifier, said received header error control value being calculated in accordance with a data error detection function providing a basis for checking the accuracy of said received cell header information including said route identifier, said routing system comprising:

a computing system having a processor and storage means;

means for receiving routing information from a network connection manager prior to said receipt of said packet, said routing information including an incoming route identifier and a destination identifier indicating said destination process is executing on said leaf node;

a packet buffer in said storage means for storing said cells of said packet, said packet buffer being associated with said destination process;

a memory element in said storage means for storing said received routing information, said memory element being addressable by an address value calculated from said data error detection function of said cell header information, said memory element storing said incoming route identifier received from the network connection manager and said packet buffer address;

said processor analyzing each of said cells in said input register upon detection of one of a plurality of predefined triggering conditions, said processor further comprising:

means for retrieving said received incoming route identifier from said cells in said input register;

means for calculating said address value and for accessing said memory element indicated by said address value; and means for placing said one or more of said cells in said data packet in said packet buffer indicated in said memory element, if said received incoming route identifiers retrieved from said received cell headers match said incoming route identifier stored in said memory element.

15. The routing system of claim 14, wherein one of said predefined triggering conditions comprises the receipt of an indication that one of said cells received at said input port is the final cell in a packet.

16. The routing system of claim 14, wherein one of said predefined triggering conditions comprises reaching a time-out condition.

17. The routing system of claim 14, wherein one of said predefined triggering conditions comprises reaching the capacity of said input register.

18. The routing system of claim 14, wherein said network is an ATM network and wherein said incoming route identifier is comprised of a virtual path identifier and a virtual channel identifier.

19. The routing system of claim 14, wherein said data error detection function is a cyclic redundancy check of said header information.

20. The routing system of claim 14, wherein said memory element is a data structure in a linked list of data structures pointed to by said data error detection function of said incoming route identifier, each of said data structures in said linked list being identified by said stored incoming route identifier.

21. A method for use by a network node for routing a cell transmitted across said network from a source process to a destination process, said received cell comprised of a received cell header, a received header error control value and received cell payload information, said received cell header including a received incoming route identifier, said received header error control value being calculated in accordance with a data error detection function selected to provide a basis for checking the accuracy of transmission of said received cell header information including said route identifier, said node employing a computing system having a processor and storage means, said routing method comprising the steps of:

receiving routing information from a network connection manager prior to said receipt of said cell, said routing information including an incoming route identifier and a destination identifier;

storing said received routing information in a memory element in said storage means, said memory element being addressable by addressing an address calculated from said data error detection function of said cell header information, said memory element storing said incoming route identifier and said destination identifier;

retrieving said received incoming route identifier from said cell header;

calculating said address value and accessing said memory element indicated by said address value; and routing said cell in accordance with said stored destination identifier, if said received incoming route identifier retrieved from said received cell header matches the incoming route identifier stored in said memory element.

22. The routing method of claim 21, wherein said network is an ATM network and wherein said incoming route identifier is comprised of a virtual path identifier and a virtual channel identifier.

23. The routing method of claim 21, wherein said data error detection function is a cyclic redundancy check of said header information.

24. The routing method of claim 21, wherein said memory element is a data structure in a linked list of data structures pointed to by said data error detection function of said incoming route identifier, each of said data structures in said linked list being identified by said stored incoming route identifier.

25. A method for storing routing information in a telecommunications switch, said routing information including said route identifier associated with one or more cells transmitted across a network from a source process to a destination process, each of said received cells comprised of a received cell header, a received header error control value and received cell payload information, said received cell header including a received incoming route identifier, said received header error control value being calculated in accordance with a data error detection function selected to provide a basis for checking the accuracy of transmission of said received cell header information, said telecommunications switch employing a computing system having a processor and storage means, said routing information storage method comprising the steps of:

receiving said routing information from a network connection manager prior to said receipt of said cell, said routing information including an incoming route identifier and a destination identifier; and storing said routing information in a memory element in said storage means, said memory element being addressed by addressing an address calculated from said data error detection function of said cell header information, said memory element storing said incoming route identifier and said destination identifier.

26. The routing information storage method of claim 25, wherein said network is an ATM network and wherein said incoming route identifier is comprised of a virtual path identifier and a virtual channel identifier.

27. The routing information storage method of claim 25, wherein said data error detection function is a cyclic redundancy check of said header information.

28. The routing information storage method of claim 25, wherein said memory element is a data structure in a linked list of data structures pointed to by said data error detection function of said incoming route identifier, each of said data structures in said linked list being identified by said stored incoming route identifier.

29. A method for use by a leaf node in a telecommunications network for routing a plurality of cells received by said node on an input port, at least one of said received cells forming a data packet and being transmitted across said network from a source process to a destination process executing on said leaf node, each of said cells received at said input port being placed in an input register, each of said received cells including a received cell header, a received header error control value and received cell payload information, said received cell header including a received incoming route identifier, said received header error control value being calculated in accordance with a data error detection function providing a basis for checking the accuracy of said received cell header information including said route identifier, said leaf node employing a computing system having a processor and storage means, said routing method comprising the steps of:

receiving routing information from a network connection manager prior to said receipt of said packet, said routing information including an incoming route identifier and a destination identifier indicating said destination process is executing on said leaf node;

storing said received routing information in a memory element in said storage means, said memory element being addressed by addressing an address calculated from said data error detection function of said received cell header information, said memory element storing said incoming route identifier and said packet buffer address; and analyzing each of said cells in said input register upon detection of one of a plurality of predefined triggering conditions, said step of analyzing each of said cells in said input register further comprising the steps of:

calculating said address value and accessing said memory element indicated by said address value; and placing said one or more of said received cells in said data packet in said packet buffer indicated in said memory element, if said received incoming route identifier retrieved from said received cell header matches the incoming route identifier stored in said memory element.

30. The routing method of claim 29, wherein one of said predefined triggering conditions comprises the receipt of an indication that one of said cells received at said input port is the final cell in a packet.

31. The routing method of claim 29, wherein one of said predefined triggering conditions comprises reaching a time-out condition.

32. The routing method of claim 29, wherein one of said predefined triggering conditions comprises reaching the capacity of said input register.

33. A network node system for routing a cell transmitted across said network from a source process to a destination process, said received cell comprised of a received cell header, a received header error control value and received cell payload information, said received cell header including a received incoming route identifier, said received header error control value being calculated in accordance with a data error detection function selected to provide a basis for checking the accuracy of transmission of said received cell header information including said route identifier, said routing system comprising:

a computing system having a processor and a storage device;

a network communication port for receiving routing information from a network connection manager prior to said receipt of said cell, said routing information including an incoming route identifier and a destination identifier;

a memory element in said storage device for storing said received routing information, said memory element being accessed by addressing an address calculated from said data error detection function of said cell header information, said memory element storing said incoming route identifier and said destination identifier;

said processor executing a plurality of computer instructions stored in said storage device, said plurality of computer instructions comprising:
- a first instruction subset for retrieving said received incoming route identifier from said received cell header;
- a second instruction subset for calculating said address value and for accessing said memory element indicated by said address value; and
- a third instruction subset for routing said cell in accordance with said stored destination identifier, if said received incoming route identifier retrieved from said received cell header matches the incoming route identifier stored in said memory element.

34. A system for storing routing information in a telecommunications switch, said routing information associated with one or more cells transmitted across a network from a source process to a destination process, each of said received cells comprised of a received cell header, a received header error control value and received cell payload information, said received cell header including a received incoming route identifier, said received header error control value being calculated in accordance with a data error detection function selected to allow checking the accuracy of transmission of said cell header information including said route identifier, said routing information being received from a network connection manager, said routing information including an incoming route identifier and a destination identifier, said telecommunications switch employing a computing system having a processor and storage means, said routing information storage system comprising:

a memory element in said storage means for storing said routing information, said memory element being accessed by addressing an address calculated from said data error detection function of said received cell header information.

35. The routing information storage system of claim 34, wherein said memory element is a data structure in a linked list of data structures pointed to by said data error detection function of said incoming route identifier, each of said data structures in said linked list being identified by said stored incoming route identifier.

36. The routing information storage system of claim 34, wherein said data error detection function is a cyclic redundancy check of said header information.

* * * * *